United States Patent
Marwah et al.

(10) Patent No.: US 12,032,683 B2
(45) Date of Patent: Jul. 9, 2024

(54) ABNORMALITY DETECTION IN LOG ENTRY COLLECTION

(71) Applicant: MICRO FOCUS LLC, Santa Clara, CA (US)

(72) Inventors: Manish Marwah, Santa Clara, CA (US); Martin Arlitt, Calgary (CA)

(73) Assignee: Micro Focus LLC, Santa Clara, CA (US)

( * ) Notice: Subject to any disclaimer, the term of this patent is extended or adjusted under 35 U.S.C. 154(b) by 87 days.

(21) Appl. No.: 17/389,247

(22) Filed: Jul. 29, 2021

(65) Prior Publication Data
US 2023/0032678 A1    Feb. 2, 2023

(51) Int. Cl.
| | |
|---|---|
| *G06F 21/54* | (2013.01) |
| *G06F 21/55* | (2013.01) |
| *G06F 21/57* | (2013.01) |
| *G06N 20/00* | (2019.01) |

(52) U.S. Cl.
CPC ............ *G06F 21/54* (2013.01); *G06F 21/552* (2013.01); *G06F 21/554* (2013.01); *G06F 21/577* (2013.01); *G06N 20/00* (2019.01)

(58) Field of Classification Search
CPC ...... G06F 21/54; G06F 21/552; G06F 21/554; G06F 21/577; G06N 20/00
See application file for complete search history.

(56) References Cited

U.S. PATENT DOCUMENTS

| | | | | |
|---|---|---|---|---|
| 6,732,124 B1 * | 5/2004 | Koseki | ............... | G06F 12/0868 |
| | | | | 711/119 |
| 7,634,625 B2 * | 12/2009 | Otani | ..................... | G06F 21/56 |
| | | | | 711/161 |
| 8,352,790 B2 * | 1/2013 | Nakagawa | .......... | G06F 11/0748 |
| | | | | 714/26 |
| 8,396,840 B1 * | 3/2013 | McHugh | ................ | G06F 3/065 |
| | | | | 707/689 |
| 8,468,134 B1 * | 6/2013 | McHugh | ........... | G06F 16/24556 |
| | | | | 707/688 |

(Continued)

OTHER PUBLICATIONS

Gu et al., "Fingerprinting Network Entities Based on Traffic Analysis in High-Speed Network Environment". Hindawi Security and Communication Networks vol. 2018, Article ID 6124160, published Dec. 16, 2018, 15 pages https://doi.org/10.1155/2018/6124160.

*Primary Examiner* — Sharon S Lynch
(74) *Attorney, Agent, or Firm* — Sheridan Ross P.C.

(57) ABSTRACT

Log entries and baseline log entries have timestamps, and can be structured over columns of respective data types. Temporal inconsistency can be identified by comparing a probability distribution of time differences between the timestamps of the log entries with a probability distribution of time differences between the timestamps of the baseline log entries. Data type inconsistency can be identified by comparing a data type of each column of the log entries with a data type of a corresponding column of the baseline log entries. Columnar inconsistency can be identified by comparing a number of the columns of the log entries with a number of the columns of the baseline log entries. In response to identification of temporal, data type, and/or columnar inconsistency, that an abnormality exists in collecting the log entries is detected.

20 Claims, 7 Drawing Sheets

(56) References Cited

U.S. PATENT DOCUMENTS

| | | | |
|---|---|---|---|
| 8,805,483 B2* | 8/2014 | Morganroth | G16H 10/20 |
| | | | 600/509 |
| 9,904,584 B2* | 2/2018 | Konig | G06Q 10/00 |
| 10,140,836 B2* | 11/2018 | Takahashi | G08B 21/187 |
| 10,146,609 B1* | 12/2018 | Leverich | G06F 11/0709 |
| 10,432,801 B2* | 10/2019 | Aoki | H04N 1/32406 |
| 10,645,100 B1 | 5/2020 | Wang et al. | |
| 10,733,038 B2* | 8/2020 | Hotta | G06F 11/0715 |
| 10,776,196 B2 | 9/2020 | Ohana et al. | |
| 10,902,114 B1 | 1/2021 | Trost et al. | |
| 10,917,420 B2 | 2/2021 | Matselyukh | |
| 11,163,629 B2* | 11/2021 | Suenaga | G06F 11/0757 |
| 11,163,632 B2* | 11/2021 | Sekiguchi | G06F 11/3476 |
| 11,310,238 B1* | 4/2022 | Vashisht | H04L 63/102 |
| 11,750,618 B1* | 9/2023 | Vashisht | H04L 63/102 |
| | | | 726/4 |
| 2010/0088747 A1* | 4/2010 | Fink | H04L 63/102 |
| | | | 726/3 |
| 2011/0029817 A1* | 2/2011 | Nakagawa | G06F 11/0709 |
| | | | 714/E11.029 |
| 2012/0233658 A1* | 9/2012 | Piersol | G06F 21/64 |
| | | | 726/2 |
| 2013/0031117 A1* | 1/2013 | Mandelstein | G06F 16/214 |
| | | | 707/758 |
| 2016/0005298 A1* | 1/2016 | Takahashi | G08B 21/187 |
| | | | 340/679 |
| 2016/0094393 A1* | 3/2016 | Kaneko | G06F 16/22 |
| | | | 709/220 |
| 2016/0117224 A1* | 4/2016 | Hotta | G06F 11/0709 |
| | | | 714/6.2 |
| 2016/0124823 A1* | 5/2016 | Ruan | G06F 11/079 |
| | | | 714/26 |
| 2018/0039555 A1* | 2/2018 | Salunke | G06F 11/3006 |
| 2018/0075235 A1* | 3/2018 | Tajima | G06F 21/554 |
| 2018/0314883 A1* | 11/2018 | Saurav | G06F 18/24 |
| 2018/0316707 A1 | 11/2018 | Dodson et al. | |
| 2019/0082058 A1* | 3/2019 | Aoki | H04N 1/32406 |
| 2019/0196898 A1* | 6/2019 | Sekiguchi | G06F 11/0751 |
| 2020/0004620 A1* | 1/2020 | Suenaga | G06F 11/0772 |
| 2020/0201744 A1* | 6/2020 | Ho | G06F 11/3684 |
| 2020/0285737 A1 | 9/2020 | Kraus et al. | |
| 2020/0412747 A1 | 12/2020 | Paine | |
| 2021/0135924 A1* | 5/2021 | Ebisawa | H04L 43/0817 |

* cited by examiner

ABNORMALITY DETECTION IN LOG ENTRY COLLECTION

BACKGROUND

A significant if not the vast majority of computing devices are globally connected to one another via the Internet. While such interconnectedness has resulted in services and functionality almost unimaginable in the pre-Internet world, not all the effects of the Internet have been positive. A downside, for instance, to having a computing device potentially reachable from nearly any other device around the world is the computing device's susceptibility to malicious cyber attacks that likewise were unimaginable decades ago.

DETAILED DESCRIPTION

Figure 1A:
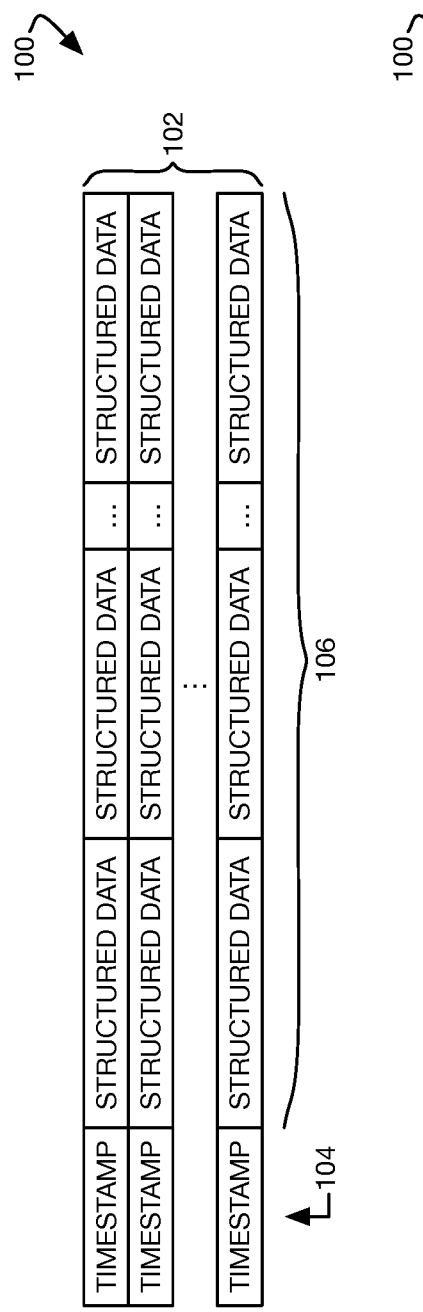
FIGS. 1A, 1B, and 1C are diagrams of example structured log entries, semi-structured log entries, and unstructured log entries, respectively.

As noted in the background, a large percentage of the world's computing devices can communicate with one another over the Internet, which is generally advantageous. Computing devices like servers, for example, can provide diverse services, including email, remote computing device access, electronic commerce, financial account access, and so on. However, providing such a service can expose a server computing device to cyber attacks, particularly if the software underlying the services has security vulnerabilities that a nefarious party can leverage to cause the application to perform unintended functionality and/or to access the underlying server computing device.

Individual servers and other devices, including other network devices and computing devices other than server computing devices, may output log entries indicating status and other information regarding their hardware, software, and communication. Such communication can include intra-device and inter-device communication as well as intra-network (i.e., between devices on the same network) and inter-network (i.e., between devices on different networks, such as devices connected to one another over the Internet) communication. The terminology log entry is used generally herein, and encompasses all types of data that such devices, or sources, may output. For example, such data that is encompassed under the rubric of log entries includes that which may be referred to as events and messages, as well as that which may be stored in databases or files of various formats.

To detect potential security vulnerabilities and potential cyber attacks by nefarious parties, voluminous amounts of data in the form of such log entries may therefore be collected, and then analyzed in an offline or online manner to identify such security issues. Log entries may further provide information regarding issues unrelated to security, such as operational issues and business activities. An enterprise or other large organization may have a large number of servers and other devices that output log entries. The log entries may be consolidated so that they can be analyzed en masse. Some security and other issues, for instance, may be more easily detected or may only be able to be detected by analyzing interrelationships among the log entries of multiple devices, or sources. Analyzing the log entries of just one computing device may not permit such security or other issues to be detected.

However, abnormalities can occur in the collection of log entries from various sources, which can resultantly impede accurate and timely detection of security or other issues that the log entries denote. For example, hardware or software may become nefariously or erroneously misconfigured, resulting in log entries being output from one or multiple computing devices (and thus collected from these devices) less frequently than desired. Individual or groups of log entries may similarly periodically fail to arrive, either because their sources do not actually output them, or because they are fully or partially dropped along their transmission paths after being output.

The hardware or software that is misconfigured or that is failing may be that of the sources outputting the log entries, or any network, computing, or other devices along the transmission paths of the log entries through their collection. Such hardware or software may similarly be malfunctioning, causing changes in the timely arrival of the log entries. If the hardware or software has completely failed (or is communicatively unreachable), such as due to a hardware failure or a software crash, log entries may not arrive at all. These types of issues pertaining to the arrival of the log entries are referred to as temporal inconsistency, in that there is inconsistency in the temporal patterns of the log entries. Identification of such temporal inconsistency is one way by which abnormalities in the collecting of the log entries can be detected.

Abnormalities in the collection of log entries can be detected by identifying other types of inconsistency as well. For example, log entries from a given source may be expected to be formatted in a particular way, with the entries structured over columns of respective data types. If a misconfiguration, malfunction, or failure results in any column storing data of an unexpected data type, the resulting analysis of the log entries may not accurately detect security or other issues. The data type of a column in this respect can be more granular than string versus integer. For example, if data of a column is historically within the range of one to twelve, such as to numerically indicate month, and changes to include values greater than twelve, then a data type change has occurred. These sorts of inconsistency are referred to as data type inconsistency, which is another way by which log entry collection abnormalities can be detected.

A third type of inconsistency by which abnormalities in the collection of log entries can be detected is referred to as columnar inconsistency. When the log entries from a given source are structured over columns of respective data types, a misconfiguration, malfunctioning, or failure can result in the number of columns changing. The subsequent analysis of the log entries may therefore not accurately detect security or other issues, because whole columns of data are missing, or additional columns are present. This kind of inconsistency is thus referred to as columnar inconsistency, and along with temporal inconsistency and data type inconsistency, permits log entry collection abnormalities to be detected.

The techniques described herein therefore detect the existence of abnormalities in the collection of log entries from one or multiple sources, such as server and other computing devices, network devices, and other types of devices, by identifying temporal, data type, and/or columnar inconsistencies within the log entries. The techniques do not analyze the data contained within the log entries for actual security or other issues. Rather, the techniques in effect analyze metadata of the log entries to determine whether they are arriving in a timely manner (i.e., temporal consistency) and are formatted correctly (i.e., data type and columnar consistency).

As to temporal consistency, just timestamps of the log entries are considered, for instance, and not any substantive data contained within the log entries that may be indicative of security or other issues like cyber attacks or security vulnerabilities. As to data type consistency, the data within the columns of the log entries is not itself considered per se, but rather just the data types of the data (i.e., the data types of the columns) are considered. As to columnar consistency, just the number of columns of the log entries is considered, and not the data in any column. Further, the detection of temporal, data type, and/or columnar inconsistency is not necessarily indicative of an underlying issue, but rather means that there is an abnormality in the collection of the log entries that may affect analysis for such issues.

The number of and amount of data contained within log entries are substantially voluminous for even a small network of computing and other devices, and can exponentially increase with larger networks such as a typical enterprise network. There is no practical way such amounts of information can be manually inspected to identify the types of inconsistency that the disclosed techniques do for log entry collection abnormality detection. Moreover, it would be arduously time-consuming to perform the disclosed techniques on an even limited set of data representing a small timeframe of collected log entries, rendering them ineffective to actually detect abnormalities in a way that such detection could be actually used.

Figure 1B:
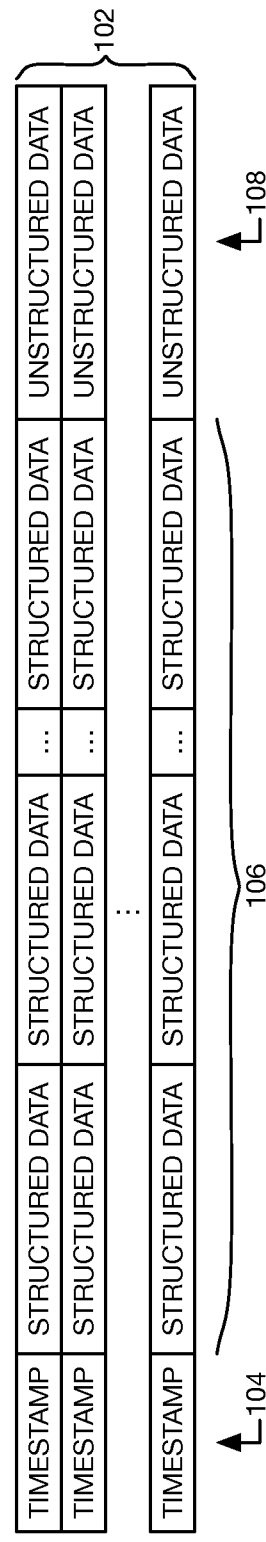
Figure 1C:
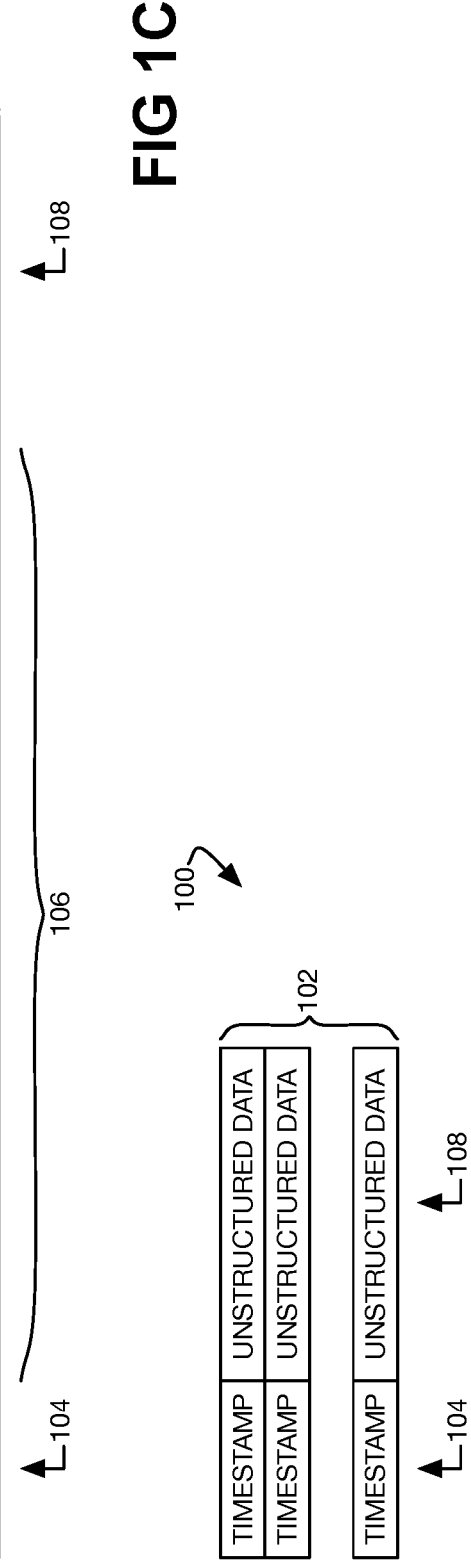

FIGS. 1A, 1B, and 1C show different examples of a data log 100. The data log 100 includes log entries 102, which may also be referred to as rows. One or multiple sources may output the log entries 102 of the data log 100, or there may be a data log 100 for each source. Each source may be a computing device, such as a server or other type of computing device, or another type of device, such as a network device. The different sources may include different types of devices. The log entries 102 may be output as the sources generate the entries 102. The log entries 102 may be collected as they are generated—i.e., the sources may transmit the entries 102 for collection as they are generated—and/or the log entries 102 may be collected in batch form, such that groups of entries 102 are periodically transmitted from the sources.

Each log entry 102 has an associated timestamp 104. The timestamp 104 may indicate when the data contained in the log entry 102 was generated, such as when an event or message of the log entry 102 was sent or received. The timestamp 104 may instead indicate when the log entry 102 itself was generated, or when the log entry 102 was transmitted by its source. The timestamp 104 may instead similarly indicate when the log entry 102 was collected.

In the example of FIG. 1A, the data log 100 is a structured log. Specifically, the data of the log entries 102 (and thus the log entries 102 themselves) are structured over multiple columns 106 that each have an associated data type. The data stored in each column 106 is therefore of the same data type, and is referred to as structured data. For example, such data types can include integer, floating point, date, categorical, fixed length characters, string, and so on.

In the example of FIG. 1B, the data log is a semi-structured log. Some of the data of the log entries 102 (and thus the log entries 102 themselves) are structured over columns 106 that have associated data types, as in the example of FIG. 1A. However, in the example of FIG. 1B, there is an additional column 108 storing unstructured data that is not of any particular data type. Such unstructured data may not have a predefined data model or schema or may not be organized in a predefined manner, as compared to the structured data of the columns 106. For example, unstructured data may be a variable length freeform text field that is not structured in any particular way. A log entry source that outputs log entries of emails that could not be sent may include the content of such an email as unstructured data, for instance.

In the example of FIG. 1C, the data log is an unstructured data. Therefore, none of the data of the log entries 102 are structured over columns 106 that have associated data types, unlike in the examples of FIGS. 1A and 1B. The log entries 102 are thus themselves not structured over columns 106 in the example of FIG. 1C. Rather, in the example of FIG. 1C, there is effectively a single column 108 storing unstructured data (not including the timestamps 104, which may be considered as constituting another column), which is the entirety of the data stored in each log entry 102. For example, log entry sources that output unstructured log entries 202 output each log entry 202 at a corresponding time indicated by the timestamp 104 of the entry 202 in question. Therefore, while the log entries 202 are unstructured, they are still temporally ordered, by their timestamps 104.

Figure 2:
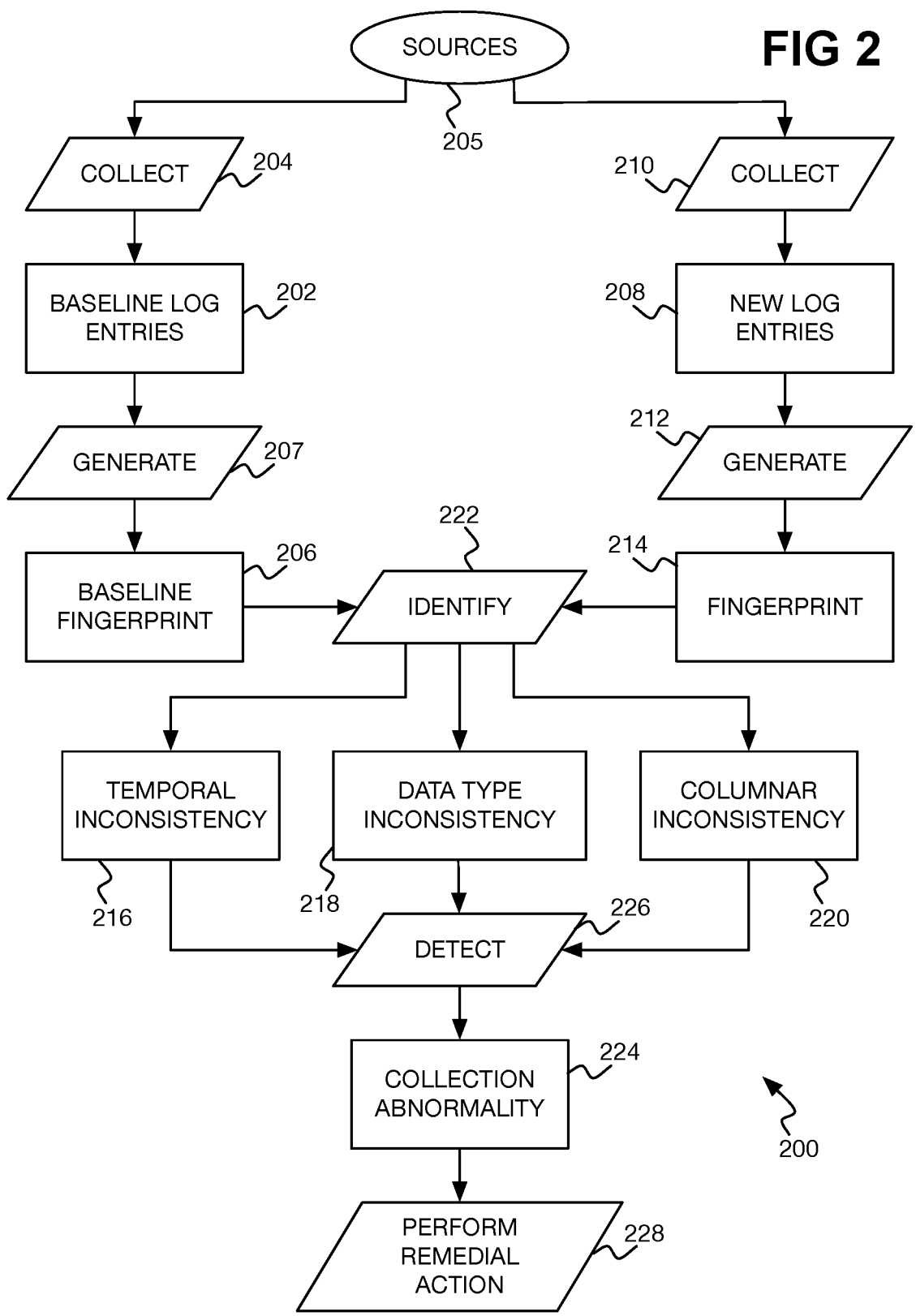
FIG. 2 is a diagram of an example process for detecting an abnormality in the collection of log entries.

FIG. 2 shows an example process 200 for detecting the existence of an abnormality in log entry collection. The process 200 may be performed by a computing device, such as a server computing device or another type of computing device. Baseline log entries 202 are first collected (204) from one or multiple sources 205, which may be computing devices or other types of devices as has been noted. The baseline log entries 202 may be historical log entries, for instance, in the sense that they log an event that has happened regarding something that may not yet have been completed. For example, the starting of a connection may be logged even though the connection has not ended, and similarly the logging of a user into a system may be recorded even though the user has not yet logged out. The log entries 202 are referred to as baseline log entries in that a baseline fingerprint 206 is generated (207) from the log entries 202 for subsequent usage in the detection of log entry collection abnormality on the basis of temporal, data type, and/or columnar inconsistency identification.

The baseline log entries 202 may be presumed or known to have temporal, data type, and/or columnar consistency, for instance, such that the baseline fingerprint 206 can be used in this respect. However, even if the baseline log entries 202 do include some inconsistency, such anomalies are likely to be small and are therefore likely to have limited effect. Nevertheless, to limit the effect of any such inconsistencies, outliers in the baseline log entries 202 (if present) may be identified and discarded. More generally, though, temporal, data type, and/or column inconsistency in subsequent log entry collection relative to the baseline log entries 202 can be identified based on the generated baseline fingerprint 206, regardless of whether the log entries 202 themselves have temporal, data type, and/or column consistency. That is, an abnormality in subsequent log entry collection is detected relative to the initially or earlier collected baseline log entries 202, using the baseline fingerprint 206 generated from these log entries 202.

The baseline fingerprint 206 can include different components or parts for each of the different types of inconsistency that may be identified, which is described in detail later in the detailed description. Generally, for instance, a probability distribution of successive timestamps of the baseline log entries 202 may form the baseline fingerprint 206 for temporal inconsistency identification. (For complex probability distributions, machine learning models may be employed to model the distributions.) Machine learning models for respective columns of the baseline log entries 202, as trained from these columns, may form the baseline fingerprint 206 for data type inconsistency identification. Each machine learning model may output the probability that an input column has the same data type as the column to which the model in question corresponds. The number of columns of the baseline log entries 202 may form the baseline fingerprint 206 for columnar inconsistency identification.

Once the baseline fingerprint 206 has been generated, new log entries 208 are collected (210) from the sources 205 and a fingerprint 214 generated (212) from the new log entries 208, in some cases in the same way in which the baseline fingerprint 206 was generated from the baseline log entries 202, as is described in detail later in the detailed description. Generally, for instance, a probability distribution of successive timestamps of the log entries 208 may form the fingerprint 214 for temporal inconsistency identification. For data type inconsistency identification, the columns of the log entries 208 (or the predicted probabilities that the data types of the columns match the data types of their respective columns of the baseline log entries 202) may form the fingerprint 214. The number of columns of the log entries 208 may form the fingerprint 214 for columnar inconsistency identification.

The baseline fingerprint 206 may be generated before the new log entries 208 are collected. In another implementation, however, the baseline fingerprint 206 may be generated after the new log entries 208 are collected. Furthermore, the fingerprint 214 may be generated periodically from rolling or adjacent time windows of collected log entries 208. For example, the fingerprint 214 may be generated on an hourly basis from the log entries 208 collected over the most recent twenty-four hours. As another example, the fingerprint 214 may be generated on an hourly basis from the log entries 208 collected during the most recent one-hour period. Periodically, such as once a day, once a week, and so on, one of the generated fingerprints 214 may become the baseline fingerprint 206.

The generation of the fingerprint 214 from the new log entries 208 may be an online process or an offline process. In an online process, as log entries 208 are collected, the fingerprint 214 is periodically regenerated. In an offline process, one portion of a previously collected data log can be assigned as the baseline log entries 202, and another portion can be assigned as the log entries 208. The fingerprint 214 in this case may be generated on the basis of all the log entries 208, or may be generated for each of a number of different windows of the log entries 208.

Temporal inconsistency 216, data type inconsistency 218, and/or columnar inconsistency 220 within the new log entries 208 is identified (222) based on the fingerprint 214 and the baseline fingerprint 206, as is described in detail later in the detailed description. Generally, the probability density generated from the log entries 208 may be compared to the probability density generated from the baseline log entries 202 for identification of temporal inconsistency 216. The machine learning models trained from the columns of the baseline log entries 202 may be applied to the columns of the log entries 208 for identification of data type inconsistency 218. The number of columns of the new log entries 208 may be compared to the number of columns of the baseline log entries 202 for identification of columnar inconsistency 220.

Temporal inconsistency 216 can be identified regardless of whether the baseline log entries 202 and the new log entries 208 are structured, semi-structured, or unstructured. This is because in each case, the log entries 202 and 208 have timestamps on which basis temporal inconsistency 216 can be identified. Data type inconsistency 218 and columnar inconsistency 220 can be identified just if the log entries 202 and 208 are structured or semi-structured. If the log entries 202 and 208 are unstructured, then the effective singular column of such unstructured data does not have a data type, and thus there cannot be data type inconsistency 218 or columnar inconsistency 220 (or data type or columnar consistency for that matter). However, in another implementation, data type inconsistency 218 can still be identified for unstructured data, as is described in detail below. If the log entries 202 and 208 are semi-structured, then data type inconsistency 218 in particular can be identified just for the columns over which the entries 202 and 208 are structured, and not for their columns of unstructured data (although in another implementation data type inconsistency 218 can still be identified for such columns, as is described in detail below).

In response to identifying temporal inconsistency 216, data type inconsistency 218, and/or columnar inconsistency 220, then the existence of an abnormality 224 in the collection of the new log entries 208 (relative to the baseline log entries 202) is detected (226). If the log entries 202 and 208 are structured or semi-structured, then log entry collection abnormality 224 is detected in response to identifying any combination of one or multiple of temporal inconsistency 216, data type inconsistency 218, and columnar inconsistency 220. If the log entries 202 are unstructured, the log entry collection abnormality 224 is detected in response to identifying temporal inconsistency 216, since neither data type inconsistency 218 nor columnar inconsistency 220 can be detected in this case. Temporal inconsistency 216 can still be detected within unstructured log entries 208, since the log entries 208 are still temporally ordered by their timestamps.

In response to detecting that an abnormality 224 exists in log entry collection, a remedial action can be performed (228). For example, a rule-based or other technique can be employed to identify a solution to resolve the abnormality 224 that exists, and then applied to resolve the abnormality 224. The solution may be the reconfiguration, restarting, rebooting, and so on, of hardware or software of the source of the log entries 208, or the hardware or software of any intervening device along the communication path between the source and the computing device performing the process 200 over which the log entries 208 are communicated, in order to restore communication. Such reconfiguration, restarting, or rebooting, may be performed in an automated manner to effectively control or change the device in question, without intervention of an administrator or other user except potentially to notify this user of the undertaken action.

As another example, the solution may be the reinstallation or upgrading of the software of the source of the log entries 208, or the software of any intervening device along the communication path between the source and the computing device performing the process 200. Such reinstallation or upgrading may also be performed in an automated manner, again without intervention of an administrator or other user except potentially for notification purposes. The solution may instead be the replacement of failed or malfunctioning hardware. An administrator or other user may be notified of the hardware to be replaced, such that replacement occurs via user intervention. However, if hot spares of the hardware are available, then such failed or malfunctioning hardware may be performed automatically via device reconfiguration.

The remedial action that is performed can additionally or instead include outputting an alert indicating the existence of the collection abnormality 224 of the new log entries 208 relative to the baseline log entries 202. For example, an administrator or other user may receive an email, text, or other type of message of the abnormality 224, for the user to perform further analysis to identify the underlying cause for resolution. The remedial action that is performed can include other types of actions as well so that the log entry collection abnormality 224 can ultimately be resolved.

For instance, if no underlying cause of the abnormality 224 is identified, then the remedial action can include substituting the fingerprint 214 for the baseline fingerprint 206 for subsequent performance of the process 200. There may be no underlying cause of the abnormality 224 if the source and intervening devices along the communication path between the source and the device performing the process 200 are correctly configured, have not failed, and are not malfunctioning. The process 200 can be periodically repeated or even continuously performed, either on an offline or an online basis as has been noted.

Figure 3:
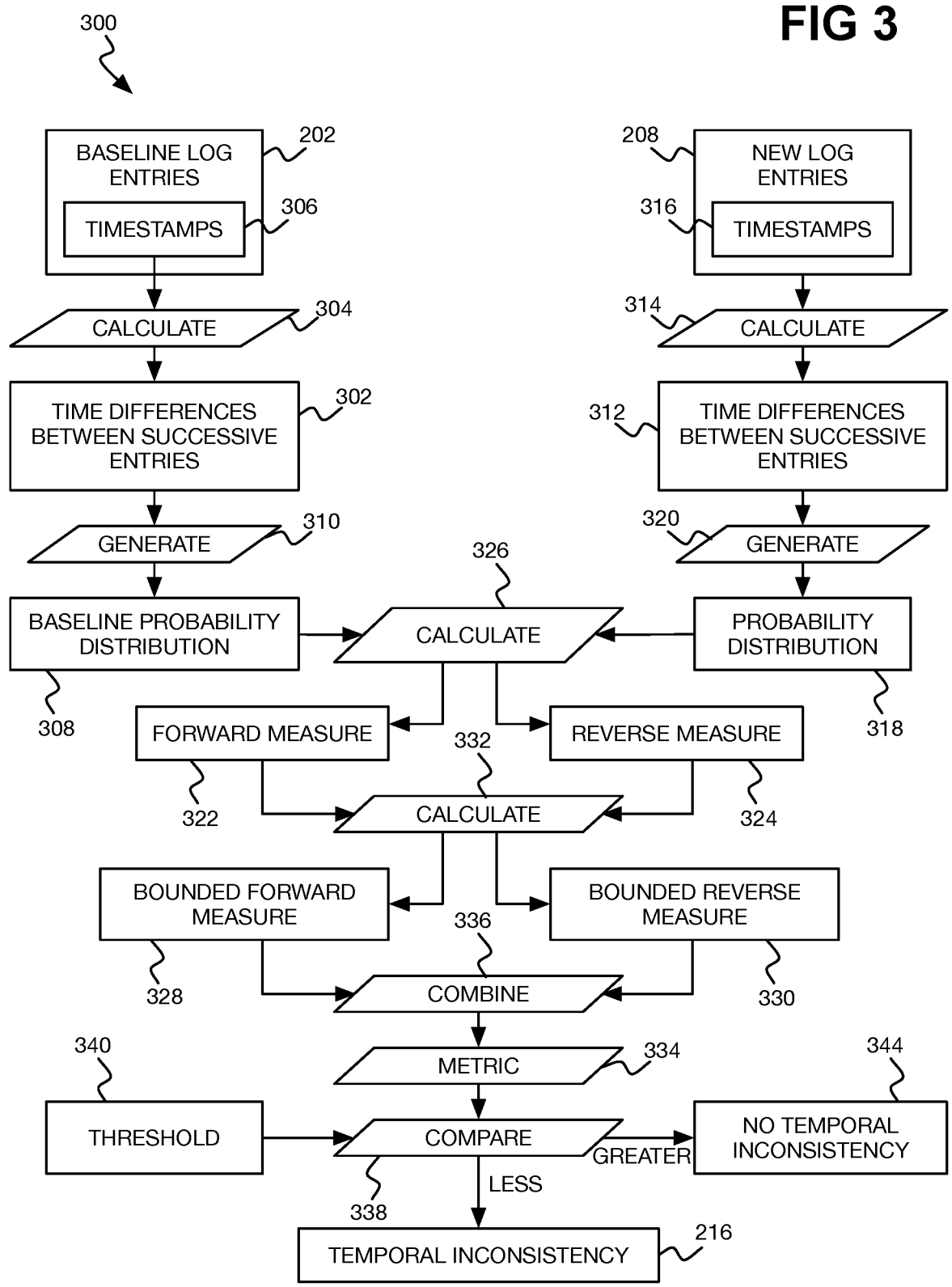
FIG. 3 is a diagram of an example process for detecting an abnormality in the collection of log entries by identifying temporal inconsistency within the log entries.

FIG. 3 shows an example process 300 for detecting log entry collection abnormality by identifying log entry temporal inconsistency. The process 300 thus can implement the process 200 for identifying temporal inconsistency 216 within the new log entries 208 relative to the baseline log entries 202. As with the process 200, the process 300 can be performed by a computing device, such as a server computing device or another type of computing device.

Time differences 302 between timestamps 306 of successive baseline log entries 202 are calculated (304). For example, there may be N baseline log entries 202 having timestamps $ts_1, ts_2, \ldots, ts_N$. Therefore, N−1 time differences 302 are calculated, which can be denoted as $td_1, td_2, \ldots, td_{N-1}$, where $td_n = ts_{n+1} - ts_n$ for each n=1 ... N−1. A baseline probability distribution 308 of the time differences 302 between successive log entries 202 is then generated (310), or calculated. The probability distribution 308 thus identifies temporal patterns of the log entries 202 based on the timestamps 306 of the log entries 202.

There may be one or multiple baseline probability distributions 308. A given baseline probability distribution 308 considers the timestamps 306 within a specified time window, such as every three hours, every twelve hours, every twenty-four hours, and so on. A baseline probability distribution 308 may consider every log entry 202 within the specified time window of that distribution 308, or may be conditioned to consider just certain of these log entries 202.

For instance, just the baseline log entries 202 of a certain type may be considered, such that the baseline probability distribution 308 is conditioned on the type of the log entries 202. For example, the log entries 202 that are considered may be just those that relate to a particular transport protocol, such that the resulting baseline probability distribution 308 is conditioned on the transport protocol in this respect. The transport protocol is considered a log entry type, in other words.

Just the baseline log entries 202 having a certain attribute or combinations of attributes may be considered, such that the baseline probability distribution is conditioned on an attribute or attributes of the log entries 202. For example, as to a time or temporal attribute, just the log entries 202 that occur during a particular hour of the day, day of the week, month, and so on, may be considered. The resulting baseline probability distribution 308 is conditioned on such a time or temporal attribute in this respect.

The hierarchical structure of the baseline log entries 202 may be considered, such that the baseline probability distribution is conditioned on this hierarchical structure. For example, the log entries 202 from different sources may be aggregated at different nodes within a hierarchical collection structure. The computing device performing the process 300 constitutes the top-most node within the structure, and the different sources are the bottom-most nodes in that the sources may not themselves have any children nodes.

The intervening nodes between the computing device performing the process 300 and the sources of the log entries 202 can be computing or other devices through which the log entries 202 from different sources (and/or hierarchically lower intervening nodes) pass (i.e., at which the entries 202 are aggregated) until the log entries 202 reach the computing device performing the process 300. Therefore, just the log entries 202 that have been aggregated at one or multiple certain such intervening nodes may be considered. The resulting baseline probability distribution 308 is conditioned on the hierarchical structure of the log entries 202 in this respect.

Time differences 312 between timestamps 316 of successive new log entries 208 are also calculated (314). A probability distribution 318 of the time differences 312 between successive log entries 208 is then generated (320). The probability distribution 318 identifies temporal patterns of the log entries 208 based on the timestamps 316 of the log entries 202. There may be one or multiple probability distributions 318, such as for different time windows. Each probability distribution 318 has a corresponding baseline probability distribution 308 that is for the corresponding time window. If a baseline probability distribution 308 is conditioned on the hierarchical log entry structure, log entry type, and/or log entry attribute so that just certain of the baseline log entries 202 are considered, the probability distribution 318 to which the baseline probability distribution 308 corresponds is similarly conditioned so that just certain of the new log entries 208 are likewise considered.

It is noted that in the case in which a probability distribution 308 or 318 is conditioned on a large number of conditions or variables (i.e., the distribution has high dimensionality), more complex techniques may be employed to estimate such a highly dimensional probability distribution. As dimensionality increases, simpler techniques may require exponentially greater amounts of data and therefore not scale well. Advanced techniques such as machine learning models like various neural network architectures may be able to estimate highly dimensional probability distributions with smaller amounts of data. Such models receive the data as input and the conditions and output the probability distribution.

The remaining description of the process 300 pertains to one baseline probability distribution 308 and one probability distribution 318. However, if there is more than one baseline probability distribution 308 and more than one probability distribution 318, then the following occurs for each probability distribution 318 and its corresponding baseline probability distribution 308. Generally, the probability distribution 318 of the time differences 312 between the timestamps 316 of successive new log entries 208 is compared to the baseline probability distribution 308 of the time differences 302 between the timestamps 306 of successive baseline log entries 202.

Specifically, a forward information-theoretic measure of the distance from the baseline probability distribution 308 to the probability distribution 318 and a reverse information-theoretic measure of the distance from the probability distribution 318 to the baseline probability distribution 308 can be calculated (326). An example of such an information-theoretic measure is KL-divergence. The KL-divergence is zero for identical distributions, and positive with no upper bound for dissimilar distributions.

The forward KL-divergence is defined as $$D_F(bp \parallel p) = \sum_i bp^i \cdot \log\left(\frac{bp^i}{p^i}\right),$$

where bp is the baseline probability distribution 308 and p is the probability distribution 318, which are each defined over multiple points i. The forward KL-divergence is the KL-divergence of the probability distribution 318 relative to the baseline probability distribution 308. The reverse KL-divergence is similarly defined as $$D_R(p \parallel bp) = \sum_i p^i \cdot \log\left(\frac{p^i}{bp^i}\right).$$

The reverse KL-divergence is the KL-divergence of the baseline probability distribution 308 relative to the probability distribution 308.

The forward and reverse KL-divergences are not symmetric. That is, $D_F(bp\parallel p) \neq D_R(p\parallel bp)$. The forward KL-divergence is high when the difference between the probability distributions 308 and 318 is high at regions of high bp. However, large differences between the distributions 308 and 318 where bp is close to zero are not well reflected in $D_F(bp\parallel p)$. Therefore, the reverse KL-divergence is used to account for regions where bp is low but p is high.

When the probability distribution 318 matches the baseline probability distribution 308, both the forward and reverse KL-divergences have to be low. When the probability distribution 318 is identical to the baseline probability distribution 308, the forward and reverse KL-divergences are zero. As noted, however, KL-divergence is unbounded, which can reduce its usefulness as a measure to compare whether the probability distribution 318 sufficiently matches the baseline probability distribution 308. Furthermore, KL-divergence is a distance measure, whereas a similarity measure may be more convenient.

Therefore, a bounded forward similarity measure 328 and a bounded reverse similarity measure 330 are calculated (332) from the forward information-theoretic measure 322 and the reverse information-theoretic measure 324, respectively. The forward similarity measure 328 may be calculated as $S_F = e^{-k \cdot D_F(bp\parallel p)}$ and the reverse similarity measure 328 may be similarly calculated as $S_R = e^{-k \cdot D_R(p\parallel bp)}$, where k is a parameter that specifies how rapidly a similarity measure decreases as the KL-divergence increases to infinity. While KL-divergence∈ (0, ∞), where 0 indicates complete similarity and ∞ indicates complete dissimilarity, the bounded similarity measure∈ (0,1), where 0 indicates complete dissimilarity and 1 indicates complete similarity.

The bounded forward similarity measure 328 and the bounded reverse similarity measure 330 can then be combined (336) into a single metric 334. For example, the single metric 334 may be the harmonic mean of the bounded forward and reverse similarity measures 328 and 330, or $$S = \frac{2}{\frac{1}{S_F} + \frac{1}{S_R}}.$$

The harmonic mean S∈ (0,1) and is symmetric in both bp and p. The single metric 334 can thus be used to identify temporal inconsistency within the new log entries 208 relative to the baseline log entries 202 as one way to detect abnormality in the collection of the log entries 208.

Specifically, the single metric 334 can be compared (338) to a threshold 340. If the metric 334 is determined as less than the threshold 340, then temporal inconsistency 216 within the new log entries 208 is resultantly identified, such that the existence of a log entry collection abnormality has been detected. By comparison, if the metric 334 is determined as greater than the threshold 340, then no temporal inconsistency 344 within the new log entries 208 is identified, such that the existence of a log entry collection abnormality has not been detected.

The described process 300 successfully identifies different types of temporal inconsistency 216 within the new log entries 208 relative to the baseline log entries 202. For example, if the time difference between successive log entries 208 is one second greater than that between successive baseline log entries 202, S may decrease from one to 0.664, and if the former time difference is five seconds greater than the latter, S may decrease from one to almost zero. If a quarter of the log entries 208 are randomly dropped, S may decrease from one to 0.90, such that a threshold 340 of 0.95 still permits detection of the collection abnormality.

Furthermore, if 10% of the log entries 208 are randomly selected, and contiguous groups of between one and ten log entries 208 are dropped at the selected log entries 208, S may decrease to 0.446. If a small number of log entries 208 are selected, and starting at these log entries 208 groups of log entries 208 covering random lengths of time between 150 and 3,600 seconds are dropped, S may decrease to nearly zero. Such examples thus inform that temporal inconsistency 216 within the new log entries 208 can be successfully identified for detecting that an abnormality exists in the collection of the log entries 208.

Figure 4:
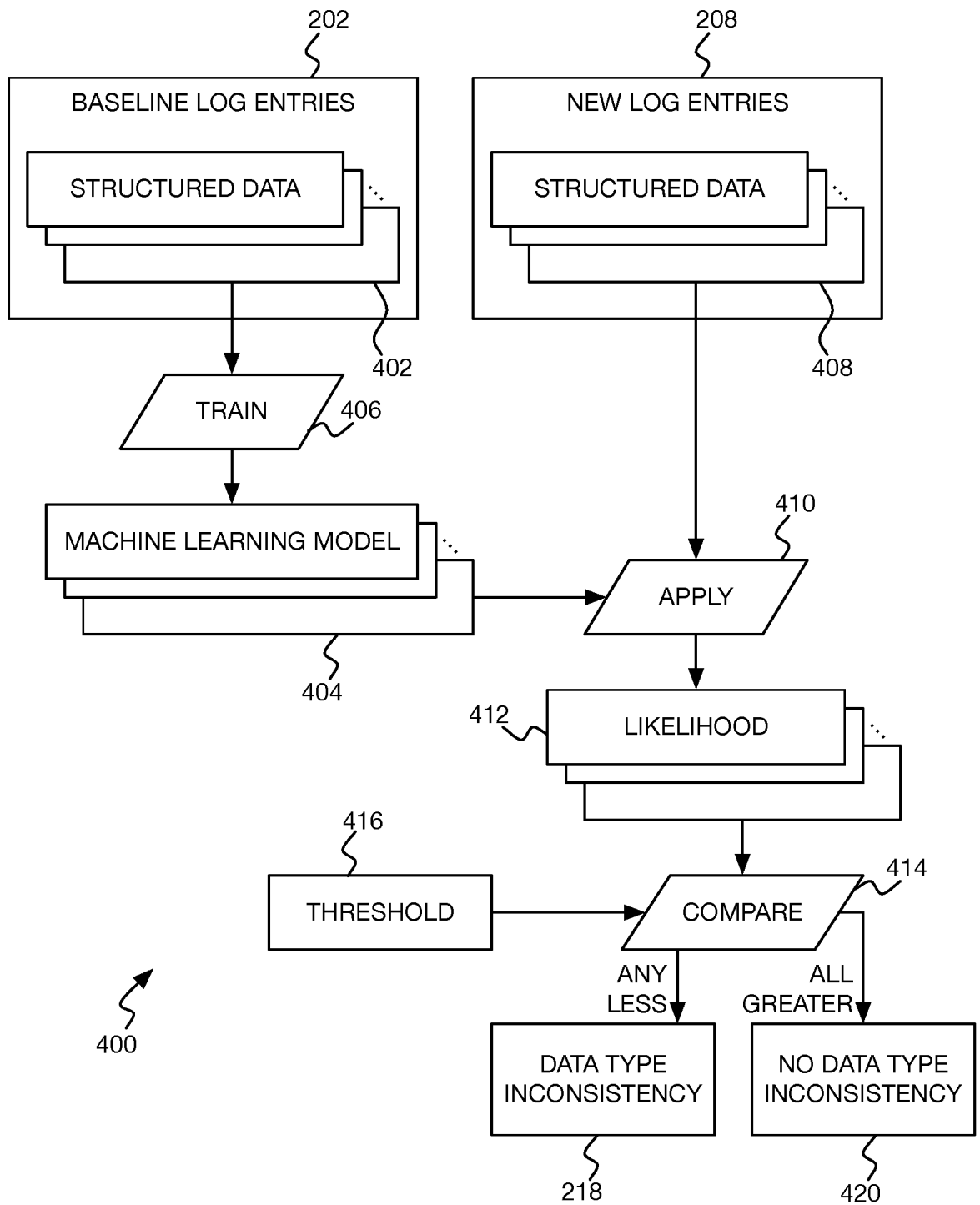
FIG. 4 is a diagram of an example process for detecting an abnormality in the collection of log entries by identifying data type inconsistency within the log entries.

FIG. 4 shows an example process 400 for detecting log entry collection abnormality by identifying log entry data type inconsistency. The process 400 can thus implement the process 200 for identifying data type inconsistency 218 within the new log entries 208 relative to the baseline log entries 202. As with the process 200, the process 400 can be performed by a computing device, such as a server computing device or another type of computing device.

The baseline log entries 202 are structured over columns 402 having associated data types. Therefore, the baseline log entries 202 store structured data within the columns 402, where each column 402 stores structured data of a corresponding data type. In the process 400, machine learning models 404 are trained (406) for and from the columns 402 of the baseline log entries 202. There is a corresponding machine learning model 404 for each column 402, which outputs the likelihood that an input column stores data having the same data type as the column 402 of the baseline log entries 202 in question. That is, a machine learning model 404 for a given column 402 provides the probability that an input column has the same data type as the column 402.

Usage of trained machine learning models 404 is this manner provides for more granular and probabilistic data type matching. For example, other techniques, such as regular expression matching, may provide a binary determination as to whether two columns store data of the same data type or not. Where such a binary result may, for example, at a coarse level distinguish between string data and numeric data, it is unable to distinguish between two columns that store numeric data but that which may nevertheless be of different types.

For example, a column 402 of the baseline log entries 202 may correspond to percentages expressed as integers between 0 and 100. An input column, by comparison, may correspond to months of the year expressed as integers between 1 and 12. A binary determination as to whether the data type of the input column matches the data type of the column 402 may yield a positive result, since both the input column and the column 402 store integers.

By comparison, a machine learning model 404 trained on (i.e., from) the column 402 may when applied to the input column yield a numeric probability as to the data type of the input column matching the data type of the column 402. The probability is higher in that both columns store integer data, and may likely be higher still because the range of the data of the input column is within the range of the data of the column 402. However, the probability is unlikely to be even higher, because the range of the data of the input column is not as wide as that of the data of the column 402. The machine learning model 404 thus provides a more nuanced and granular estimation of the likelihood that the input column matches the column 402 in data type.

The new log entries 208 are similarly structured over columns 408 having associated data types. As such, the log entries 208 store structured data within the columns 408, with each column 408 storing structured data of a corresponding data type. Generally, the data type of each column 408 of the new log entries 208 is compared to the data type of a corresponding column 402 of the baseline log entries 202 to determine whether the data types match. More specifically, the machine learning model 404 for the corresponding column 402 is applied (410) to the column 408 in question to determine whether the data type of the column 408 matches the data type of its corresponding column 402.

Application of the machine learning models 404 to respective columns 408 of the new log entries 208 therefore provides likelihoods 412 that the data types of the columns 408 match the data types of their respective columns 402 of the baseline log entries 202. The likelihood 412 for each column 408 is compared (414) to a threshold 416. If the likelihood 412 for any column 408 is less the threshold 416, then data type inconsistency 218 within the new log entries 208 relative to the baseline log entries 202 is identified, such that the existence of a log entry collection abnormality has been detected. By comparison, if the likelihood 412 for every column 408 is greater than the threshold 416, then no data type inconsistency 420 is identified, such that the existence of a log entry collection abnormality has not been detected.

Therefore, data type inconsistency within the new log entries 208 relative to the baseline log entries 202 occurs when there is data type inconsistency in any column 408 of the log entries 208 relative to its corresponding column 402 of the baseline log entries 202. The columns 408 of all the new log entries 208 have to have data type consistency relative to their corresponding columns 402 of the baseline log entries 202 for there to be no data type inconsistency. The described process 400 thus provides a probabilistic and granular way by which data type inconsistency can be identified to detect log entry collection abnormality.

The process 400 pertains to structured data. For unstructured data—i.e., a column that includes unstructured data—data type inconsistency may not be identified. However, in another implementation, data type inconsistency may still be identified within unstructured data, by identifying whether the unstructured data is corrupted.

For example, unstructured data usually includes metadata indicating whether the unstructured data is in the form of an image, video, audio, or text. For images, a machine learning model such as a deep convolutional neural network may be trained based on past data that outputs the probability that a new image is of the same type as the past images. Other metrics, such as the entropy of an image, may also be calculated to determine that an image is not blank (where a blank image has very low entropy), and is not random noise (where a random noise image has very high entropy).

Videos can be considered as frames of images. Therefore, similar techniques may be applied on a per-frame basis. An information theoretic metric may further be calculated to capture the dependency between frames to detect corrupted video.

For audio, a machine learning model may similarly be trained based on past audio to determine its likelihood of new audio being consistent with past audio. Silence detection techniques may also be employed determine if the audio is silent (i.e., no audio was actually recorded). Voice activity detection (VAD) approaches may be used if it is known (such as from meta data) that the audio should contain human speech, in order to check for corruption.

For text, a language model, such as a transformer-based model may be used to determine if each sentence in the text reasonably (that is, has high enough probability) conveys language and is not garbled. An example of such a transformer-based model is the Generative Pre-trained Transformer 3 (GPT-3) model. Another machine learning model trained on past text may be used to verify consistency of new text as well.

Figure 5:
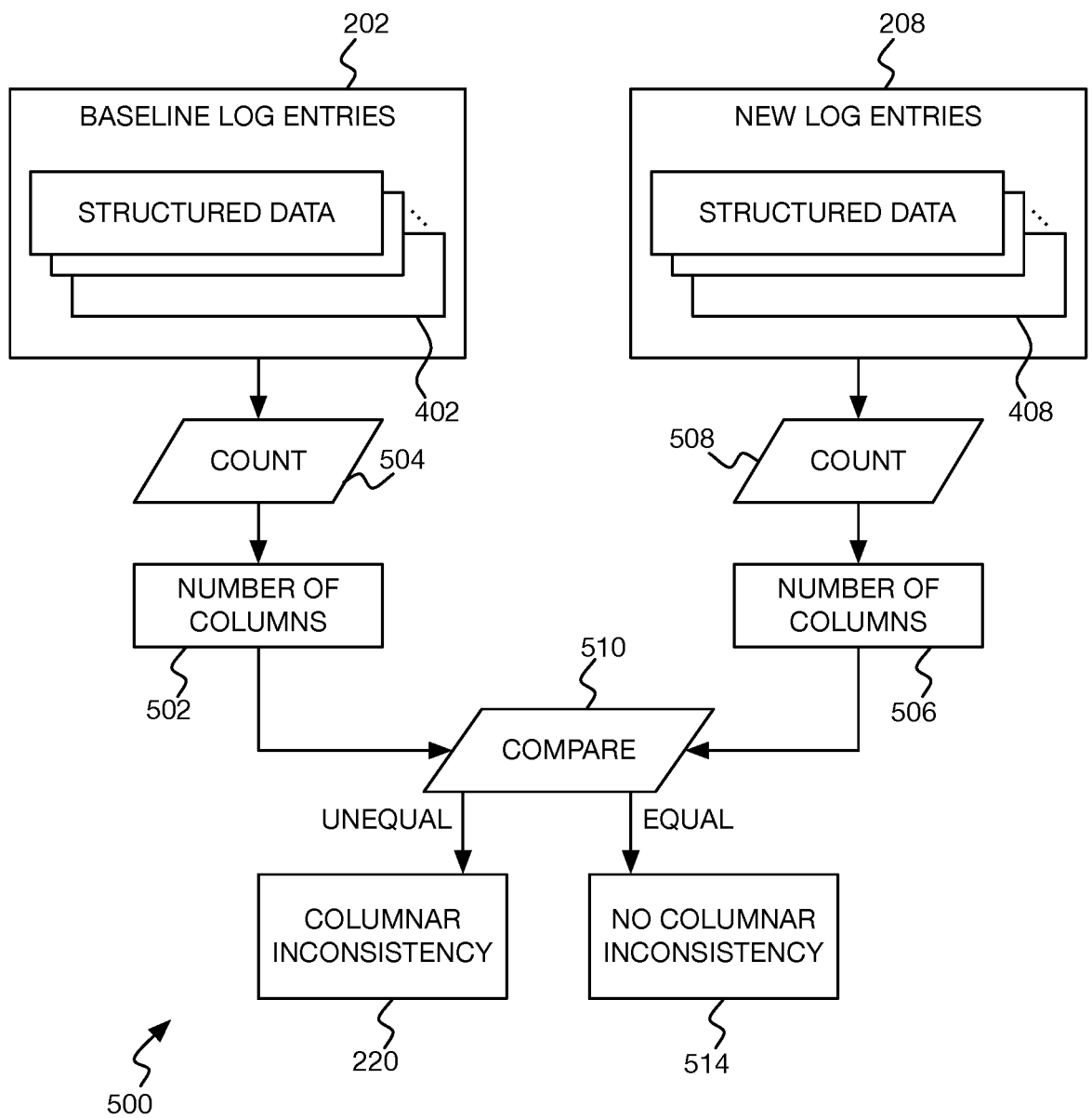
FIG. 5 is a diagram of an example process for detecting an abnormality in the collection of log entries by identifying columnar inconsistency within the log entries.

FIG. 5 shows an example process 500 for detecting log entry collection abnormality by identifying columnar inconsistency. The process 500 can implement the process 200 for identifying columnar inconsistency 220 within the new log entries 208 relative to the baseline log entries 202. As with the process 200, the process 500 can be performed by a computing device, such as a server computing device or another type of computing device.

As in the process 400, the baseline log entries 202 are structured over columns 402, and the new log entries 208 are structured over columns 408. The number 502 of columns 402 of the baseline log entries 202 is counted (504), and likewise the number 506 of columns 408 of the new log entries 208 is counted (508). The number 502 of columns 402 of the baseline log entries 202 and the number 506 of columns 408 of the new log entries 208 are compared to one another (510).

If the number 506 of columns 408 of the new log entries 208 differs from the number 502 of columns 402 of the baseline log entries 202, then columnar inconsistency 220 of the new log entries 208 relative to the baseline log entries 202 is identified, such that the existence of a log entry collection abnormality has been detected. (Furthermore, which columns are missing or have been added to the new log entries 208 vis-à-vis the baseline log entries 202 may be identified by identifying the data types of the columns of the new log entries 202 and comparing them to the data types of the columns of the baseline log entries 202.) By comparison, if the number 506 of columns 408 of the new log entries 208 is equal to the number 502 of columns 402 of the baseline log entries 202, then no columnar inconsistency 514 of the new log entries 208 relative to the baseline log entries 202 is identified. As such, the existence of a log entry collection abnormality has not been detected.

Figure 6:
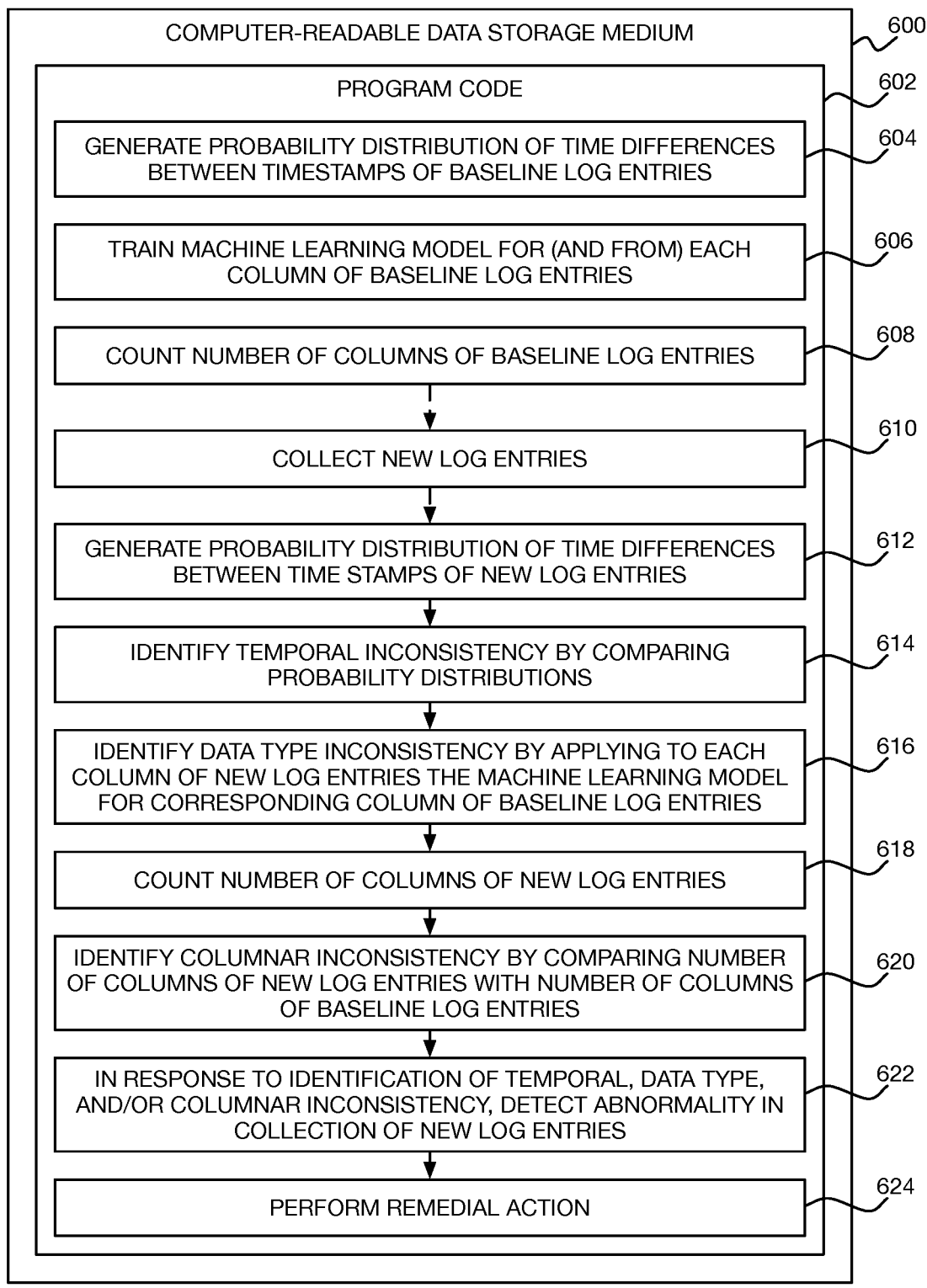
FIG. 6 is a diagram of an example non-transitory computer-readable data storage medium.

FIG. 6 shows an example non-transitory computer-readable data storage medium 600 storing program code 602 executable by a processor, such as that of a server or other type of computing device, to perform processing, such as a method. The processing includes generating a baseline probability distribution 308 of time differences 302 between timestamps 306 of baseline log entries 202 (604). The processing can include training a machine learning model 404 for (and from) each column 402 of the baseline log entries 202 (606), and counting a number 502 of columns 402 of the baseline log entries 202 (608).

The processing includes then collecting new log entries 208 (610). The processing includes generating a probability distribution 318 of time differences 312 between timestamps 316 of the new log entries 208 (612), and identifying temporal inconsistency 216 by comparing the probability distributions 308 and 318 (614). The processing can include identifying data type inconsistency 218 by applying to each column 408 of the new log entries 208 the machine learning model 404 for the corresponding column 402 of the baseline log entries 202 (616).

The processing can include counting the number 506 of columns 408 of the new log entries 208 (618). The processing can include then identifying columnar inconsistency 220 by comparing the number 506 of columns 408 of the new log entries 208 with the number 502 of columns 402 of the baseline log entries 202 (620). In response to identification of any combination of one or more of temporal inconsistency 216, data type inconsistency 218, and columnar inconsistency 220 (622), the processing can include performing a remedial action (624).

Figure 7:
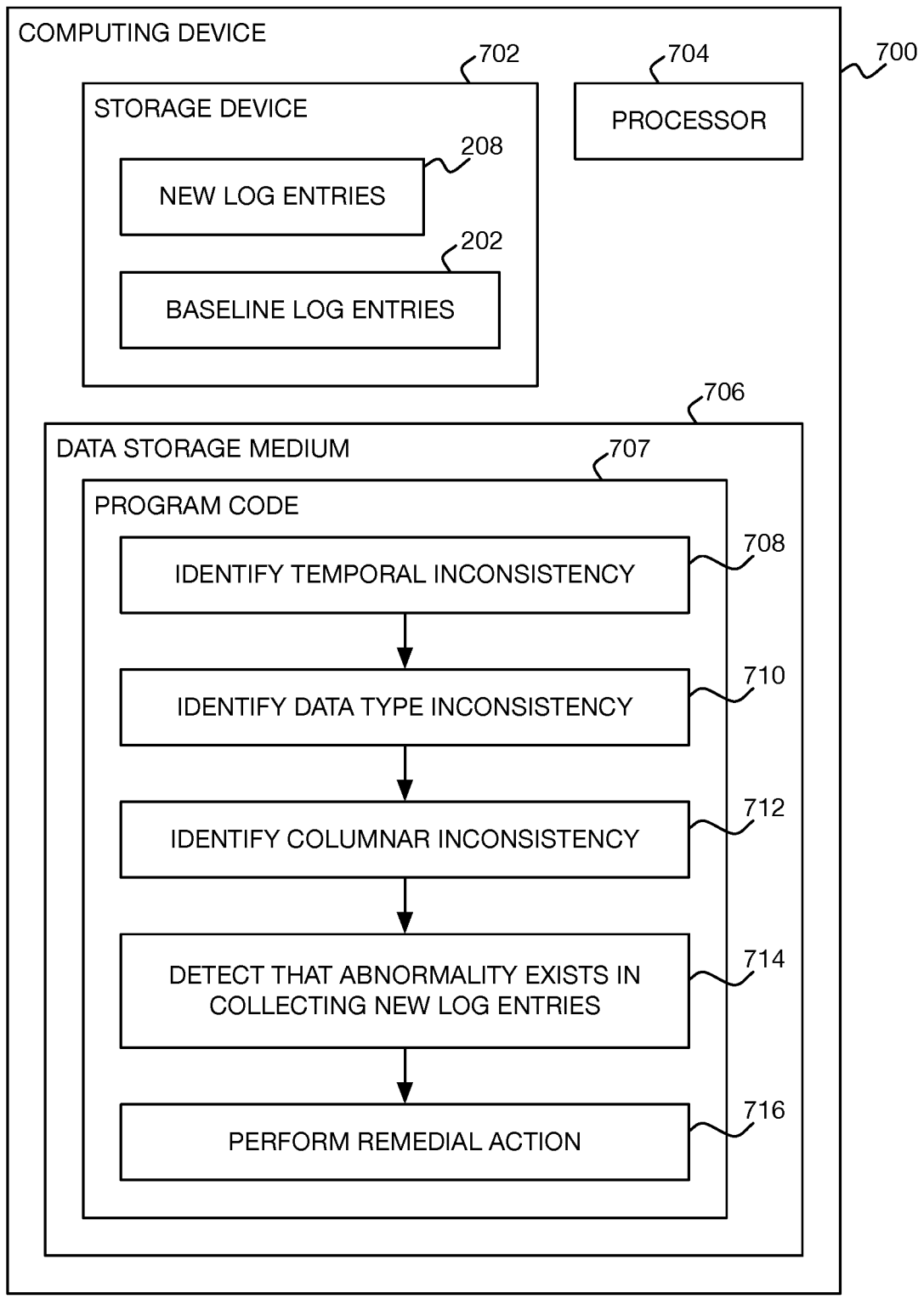
FIG. 7 is a diagram of an example computing device.

FIG. 7 shows an example computing device 700, which may be a server or other type of computing device. The computing device 700 includes a storage device 702, such as hard disk drive, a solid-state drive, or other type of non-volatile storage device. The storage device 702 stores new log entries 208 and baseline log entries 202. The computing device 700 also includes a processor 704 and a non-transitory computer-readable data storage medium 706, such as a volatile or non-volatile memory, which stores program code 707 that is executable by the processor 704 to perform processing.

The processing includes identifying temporal inconsistency 216 within the new log entries 208 by comparing a probability distribution 318 of the time differences 312 between the timestamps 316 of the new log entries 208 with a baseline probability distribution 308 of the time differences 302 between the timestamps 306 of the baseline log entries 202 (708). The processing includes identifying data type inconsistency 218 within the new log entries 208 by comparing a data type of each column 408 of the new log entries 208 with a data type of a corresponding column 402 of the baseline log entries 202 (710). The processing includes identifying columnar inconsistency 220 within the new log entries 208 by comparing the number 506 of columns 408 of the new log entries 208 with the number 502 of columns 402 of the baseline log entries 202 (712).

The processing includes, in response identifying one or multiple of temporal inconsistency 216, data type inconsistency 218, and columnar inconsistency 220, detecting that an abnormality 224 exists in collecting the new log entries 202 (714). That is, if no temporal inconsistency 216, data type inconsistency 218, or columnar inconsistency 220 is detected, then no log entry collection abnormality 224 is detected. The processing includes, in response to detecting that the abnormality 224 exists in collecting the new log entries 202, performing a remedial action (716).

Techniques have been described for detecting the existence of abnormalities in the collection of new log entries 208 from one or multiple sources, in comparison to baseline log entries 202 previously collected from such sources. The detection of log entry collection abnormalities ensures that subsequent analysis of the data the log entries 208 contain will more accurately identify security or other issues. Log entry collection abnormalities can be detected by identifying temporal, data type, and/or columnar inconsistencies within the new log entries 208 relative to the baseline log entries 202.

We claim:

1. A non-transitory computer-readable data storage medium storing program code executable by a processor to perform processing comprising:

storing a plurality of log entries and a plurality of baseline log entries, the log entries and the baseline log entries having timestamps and structured over a plurality of columns of respective data types;

generating a fingerprint from a probability distribution of time differences between the timestamps of the plurality of log entries, the fingerprint identifying temporal patterns of the log entries based on the timestamps of the log entries;

identifying temporal inconsistency within the log entries by comparing the fingerprint with a baseline fingerprint generated from a probability distribution of time differences between the timestamps of the plurality of baseline log entries, the baseline fingerprint identifying temporal patterns of the baseline log entries based on the timestamps of the baseline log entries;

identifying data type inconsistency within the loci entries by comparing a data type of each column of the log entries with a data type of a corresponding column of the baseline log entries;

identifying columnar inconsistency within the log entries by comparing a number of columns of the log entries with a number of columns of the baseline log entries;

in response to identifying one or multiple of the temporal inconsistency, the data type inconsistency, and the columnar inconsistency, detecting that an abnormality exists in a process by which the log entries were collected, such that the log entries were not collected correctly; and in response to detecting that the abnormality exists in the process by which the log entries were collected, performing a remedial action on a source of the log entries that were not collected correctly so that future log entries are collected correctly.

2. The non-transitory computer-readable data storage medium of claim 1, wherein performing the remedial action comprises:
identifying a solution to resolve the abnormality that exists in collecting the log entries; and
applying the solution to resolve the abnormality.

3. The non-transitory computer-readable data storage medium of claim 1, wherein performing the remedial action comprises:
outputting an alert indicating existence of the abnormality in collecting the log entries.

4. The non-transitory computer-readable data storage medium of claim 1, wherein generating the fingerprint from the probability distribution of the time differences between the timestamps of the plurality of log entries comprises:
generating a probability distribution of time differences between the timestamps of successive log entries,
wherein the baseline fingerprint comprises a baseline probability distribution of time differences between the timestamps of successive baseline log entries.

5. The non-transitory computer-readable data storage medium of claim 4, wherein the probability distribution of the time differences between the timestamps of successive log entries comprises a probability distribution of the time differences between the timestamps of successive log entries conditioned on one or multiple of:
a hierarchical structure of the log entries;
a type of the log entries; and
an attribute of the log entries.

6. The non-transitory computer-readable data storage medium of claim 4, wherein comparing the fingerprint with the baseline fingerprint comprises:
comparing the probability distribution with the baseline probability distribution.

7. The non-transitory computer-readable data storage medium of claim 6, wherein comparing the probability distribution with the baseline probability distribution comprises:
calculating a forward information-theoretic measure of a distance from the baseline probability distribution to the probability distribution; and
calculating a reverse information-theoretic measure of a distance from the probability distribution to the baseline probability distribution.

8. The non-transitory computer-readable data storage medium of claim 7, wherein the forward information-theoretic measure comprises a KL-divergence of the probability distribution relative to the baseline probability distribution, and wherein the reverse information-theoretic measure comprises a KL-divergence of the baseline probability distribution relative to the probability distribution.

9. The non-transitory computer-readable data storage medium of claim 7, wherein comparing the probability distribution with the baseline probability distribution further comprises:
calculating a bounded forward similarity measure based on the forward information-theoretic measure;
calculating a bounded reverse similarity measure based on the reverse information-theoretic measure; and
combining the bounded forward and reverse similarity measures into a single metric.

10. The non-transitory computer-readable data storage medium of claim 9, wherein combining the bounded forward and reverse similarity measures into the single metric comprises:
calculating a harmonic mean of the bounded forward and reverse similarity measures as the single metric.

11. The non-transitory computer-readable data storage medium of claim 9, wherein the temporal inconsistency within the log entries is further identified by:
determining that the single metric is less than a threshold.

12. The non-transitory computer-readable data storage medium of claim 1, wherein comparing the data type of each column of the log entries with the data type of the corresponding column of the baseline log entries comprises:
applying a machine learning model to each column of the log entries that provides a likelihood that the data type of the column matches the data type of the corresponding column of the baseline log entries, the machine learning model having been trained from the corresponding column of the baseline log entries, the baseline fingerprint comprising the machine learning model.

13. The non-transitory computer-readable data storage medium of claim 12, wherein the data type inconsistency within the log entries is further identified by:
determining that the likelihood that the data type of any column of the log entries matches the data type of the corresponding column of the baseline log entries is less than a threshold.

14. A method comprising:
generating, by a processor, a baseline fingerprint from a baseline probability distribution of time differences between timestamps of a plurality of baseline log entries, the baseline fingerprint identifying temporal patterns of the baseline log entries based on the timestamps of the baseline log entries;
collecting, by the processor, new log entries having timestamps and storing the new log entries and baseline log entries in a structured format over a plurality of columns of respective data types;
generating, by the processor, a fingerprint from a probability distribution of time differences between the timestamps of the new log entries, the fingerprint identifying temporal patterns of the new log entries based on the timestamps of the new log entries;
identifying, by the processor, temporal inconsistency within the new log entries by comparing the probability distribution of the fingerprint with the baseline probability distribution of the baseline fingerprint;
identifying, by the processor, data type inconsistency within the new log entries by comparing a data type of each column of the new log entries with a data type of a corresponding column of the baseline log entries;
identifying, by the processor, columnar inconsistency within the new log entries by comparing a number of columns of the new log entries with a number of columns of the baseline log entries;
in response to identifying one or multiple of the temporal inconsistency, the data type inconsistency, and the columnar inconsistency, detecting, by the processor, that an abnormality exists in a process by which the new log entries were collected, such that the new log entries were not collected correctly; and
in response to detecting that the abnormality exists in the process by which the new log entries were collected, performing, by the processor, a remedial action on a source of the new log entries that were not collected correctly so that future log entries are collected correctly.

15. A computing device comprising:
- a storage device storing a plurality of log entries and a plurality of baseline log entries, the log entries and the baseline log entries having timestamps and structured over a plurality of columns of respective data types;
- a processor; and
- a non-transitory computer-readable data storage medium storing program code that the processor executes to:
  - generate a baseline fingerprint from a probability distribution of time differences between the timestamps of the plurality of baseline log entries, the baseline fingerprint identifying temporal patterns of the baseline log entries based on the timestamps of the baseline log entries;
  - generate a fingerprint from a probability distribution of time differences between the timestamps of the plurality of log entries, the fingerprint identifying temporal patterns of the log entries based on the timestamps of the log entries;
  - identify temporal inconsistency within the log entries by comparing the probability distribution of the fingerprint with the probability distribution of the baseline fingerprint;
  - identify data type inconsistency within the log entries by comparing a data type of each column of the log entries with a data type of a corresponding column of the baseline log entries;
  - identify columnar inconsistency within the log entries by comparing a number of columns of the log entries with a number of columns of the baseline log entries;
  - in response to identifying one or multiple of the temporal inconsistency, the data type inconsistency, and the columnar inconsistency, detect that an abnormality exists in a process by which the log entries were collected, such that the log entries were not collected correctly; and
  - in response to detecting that the abnormality exists in the process by which the log entries were collected, perform a remedial action on a source of the log entries that were not collected correctly so that future log entries are collected correctly.

16. The non-transitory computer-readable data storage medium of claim 1, wherein the base fingerprint is generated before the log entries are collected.

17. The method of claim 14, wherein performing the remedial action comprises:
- identifying a solution to resolve the abnormality that exists in collecting the new log entries; and
- applying the solution to resolve the abnormality.

18. The method of claim 14, wherein performing the remedial action comprises:
- outputting an alert indicating existence of the abnormality in collecting the new log entries.

19. The computing device of claim 15, wherein the processor performs the remedial action by:
- identifying a solution to resolve the abnormality that exists in collecting the log entries; and
- applying the solution to resolve the abnormality.

20. The computing device of claim 15, wherein the processor performs the remedial action by:
- outputting an alert indicating existence of the abnormality in collecting the log entries.

* * * * *